United States Patent
Dörfler et al.

(10) Patent No.: US 10,183,599 B2
(45) Date of Patent: Jan. 22, 2019

(54) DEVICE AND METHOD FOR ADJUSTING A CONTOUR OF A VEHICLE SEAT WITH CONTOUR ADJUSTMENT

(71) Applicant: Alfmeier Präzision AG Baugruppen und Systemlösungen, Treuchtlingen (DE)

(72) Inventors: Erich Dörfler, Landsberg (DE); Karl-Heinrich Preis, Bühlertal (DE)

(73) Assignee: Alfmeier Präzision AG Baugruppen Und Systemlösungen, Treuchlingen (DE)

( * ) Notice: Subject to any disclaimer, the term of this patent is extended or adjusted under 35 U.S.C. 154(b) by 71 days.

(21) Appl. No.: 15/092,789

(22) Filed: Apr. 7, 2016

(65) Prior Publication Data
US 2016/0297333 A1    Oct. 13, 2016

(30) Foreign Application Priority Data

Apr. 9, 2015 (DE) .......................... 10 2015 105 416
Aug. 7, 2015 (DE) .......................... 10 2015 113 029

(51) Int. Cl.
*B60N 2/90*    (2018.01)

(52) U.S. Cl.
CPC .................................. *B60N 2/914* (2018.02)

(58) Field of Classification Search
CPC .................................................. B60N 2/4415
See application file for complete search history.

(56) References Cited

U.S. PATENT DOCUMENTS

| 5,127,708 A * | 7/1992 | Kishi ....................... A61B 5/18 |
| | | 297/284.1 |
| 6,422,087 B1 * | 7/2002 | Potter .................. B60N 2/0232 |
| | | 701/49 |
| 8,678,500 B2 | 3/2014 | Lem et al. |
| 2005/0067868 A1 * | 3/2005 | Kern .................... B60N 2/4415 |
| | | 297/284.6 |

(Continued)

FOREIGN PATENT DOCUMENTS

| DE | 8327656 U1 | 1/1984 |
| DE | 102010022020 | 12/2001 |
| DE | 102004060027 A1 | 6/2006 |

OTHER PUBLICATIONS

German Office Action dated Nov. 9, 2015, for DE 102015113029.7 (with Machine Translation).

*Primary Examiner* — Timothy J Brindley
(74) *Attorney, Agent, or Firm* — JK Intellectual Property Law, PA

(57) ABSTRACT

A device to adjust a contour of a vehicle seat with contour adjustment, may include at least one air cushion connected to a pump via a supply line, a first valve for opening and closing the supply line, and a control and evaluation unit to determine an air volume being supplied to the at least one air cushion via an operating time of the pump and to correlate the air volume being supplied to the at least one air cushion with a contour of the vehicle seat. A related method for adjusting a contour of a vehicle seat with contour adjustment equipped with such a device, may include determining an air volume being supplied to the at least one air cushion via the operating time of the pump, and the air volume being supplied to the at least one air cushion is correlated with a contour of the vehicle seat.

11 Claims, 1 Drawing Sheet

(56) References Cited

U.S. PATENT DOCUMENTS

| | | | |
|---|---|---|---|
| 2005/0242644 A1 | 11/2005 | Bauer et al. | |
| 2010/0117414 A1* | 5/2010 | Hwang | B60N 2/4415 |
| | | | 297/217.3 |
| 2010/0181813 A1* | 7/2010 | Kramer | B60N 2/0244 |
| | | | 297/217.3 |
| 2010/0231016 A1* | 9/2010 | Volz | B60N 2/0244 |
| | | | 297/217.1 |
| 2010/0276973 A1* | 11/2010 | Zenk | B60N 2/0244 |
| | | | 297/284.3 |
| 2010/0289302 A1* | 11/2010 | Cheng | B60N 2/002 |
| | | | 297/180.12 |
| 2011/0282495 A1* | 11/2011 | Fischer | B60N 2/0224 |
| | | | 700/275 |
| 2012/0223554 A1* | 9/2012 | Lem | B60N 2/4415 |
| | | | 297/217.1 |
| 2014/0232155 A1* | 8/2014 | Bocsanyi | A47C 4/54 |
| | | | 297/284.6 |
| 2015/0008710 A1* | 1/2015 | Young | B60N 2/0276 |
| | | | 297/217.3 |
| 2015/0210192 A1* | 7/2015 | Benson | B60N 2/505 |
| | | | 297/217.2 |
| 2015/0321590 A1* | 11/2015 | Mizoi | B60N 2/62 |
| | | | 297/284.1 |
| 2016/0129920 A1* | 5/2016 | Hall | B60W 50/16 |
| | | | 701/1 |
| 2016/0185263 A1* | 6/2016 | Uno | B60N 2/665 |
| | | | 297/284.1 |
| 2016/0207429 A1* | 7/2016 | Fitzpatrick | B60N 2/646 |
| 2016/0229316 A1* | 8/2016 | Tamura | B60N 2/2222 |
| 2017/0028163 A1* | 2/2017 | Onuma | B60W 40/09 |
| 2017/0043681 A1* | 2/2017 | Seiller | B60N 2/0244 |
| 2017/0144571 A1* | 5/2017 | Chiba | B60N 2/4415 |
| 2017/0159839 A1* | 6/2017 | Dankbaar | F16K 31/002 |

\* cited by examiner

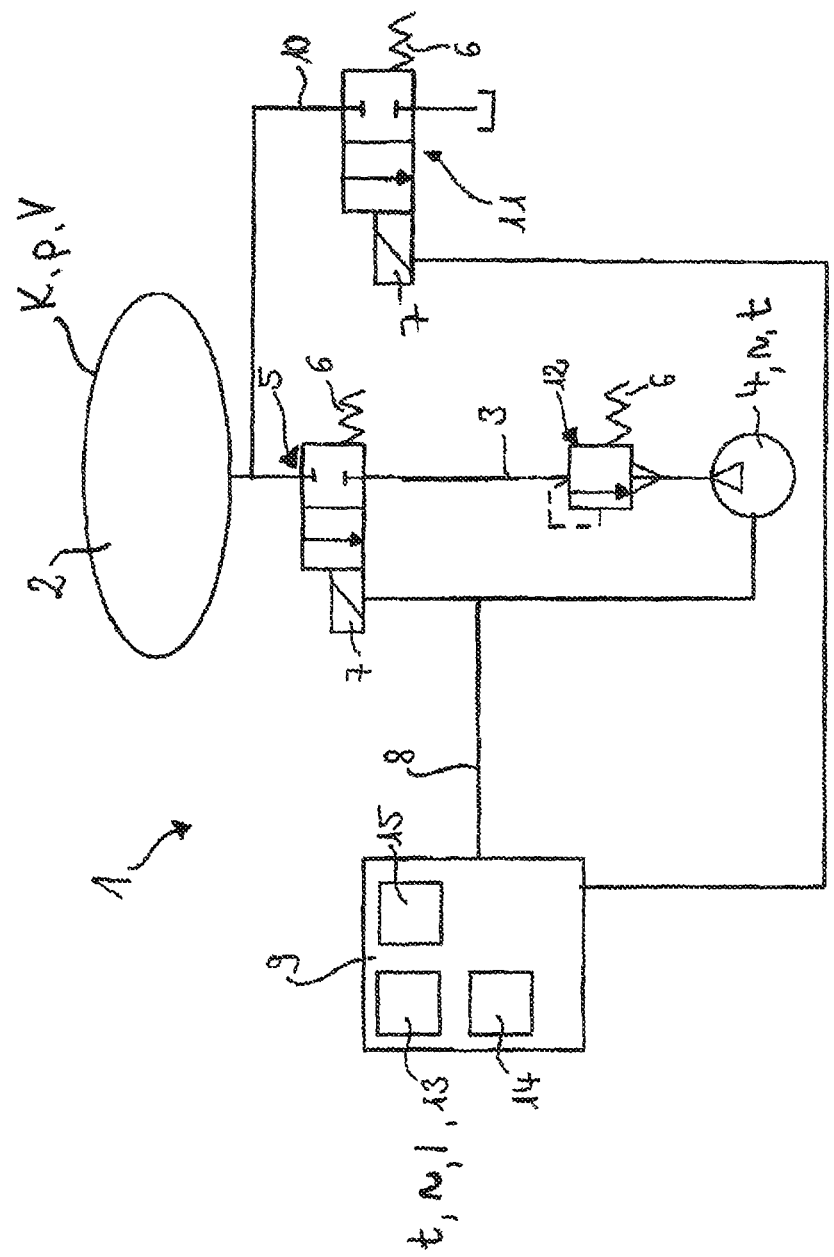

DEVICE AND METHOD FOR ADJUSTING A CONTOUR OF A VEHICLE SEAT WITH CONTOUR ADJUSTMENT

CROSS-REFERENCE TO RELATED APPLICATIONS

This application claims benefit to German Patent Application Number 102 015 105 416.7, filed Apr. 9, 2015 and German Patent Application Number 102 015 113 029.7, filed Aug. 7, 2015, both of which are incorporated by reference herein in their entirety.

TECHNICAL FIELD

The invention refers to a device and a method for adjusting a vehicle seat contour with contour adjustment. So that the contour can be adjusted, i.e. to change the form of the backrest or seating cushion of a vehicle seat, at least one air cushion that can be filled with pressurized air via a supply line connected to a pump is necessary. To control the filling and emptying of the air cushion, a first valve has been arranged in the supply line.

BACKGROUND

To adjust and change the contour of a vehicle seat, the air cushions available in the vehicle seat are selectively filled with air end emptied. To do this, so-called cross rocker switches with four switching positions, upwards-downwards and forwards-backwards are used. In the upwards-downwards switching position, the form (i.e. the contour or total air quantity inside the air cushion) should remain constant and merely vertically adjust the curvature of the air cushion or lordosis position. In the frontwards-backwards switching position, the form or intensity of the lordosis adjustment to the current position can be strengthened or weakened, in other words, the curvature of the lordosis can be changed.

To achieve vertical adjustment, the pressures in the air cushion are regulated in such a way that certain pressure values are set in the individual air cushions for each adjusting position. To do this, it is customary for pressure sensors to measure the pressures and report them back to a pump control or separate control valve. To measure the pressure—to be more precise, the excess pressure in one or several air cushions—two absolute sensors are used, i.e. sensors designed to measure absolute pressure. In this case, one sensor measures the absolute pressure of the air cushion and the other sensor the absolute pressure of the surroundings. The excess pressure in the air cushion is determined with an electronic unit from the difference of the absolute pressures mentioned above. The disadvantage of this is that two absolute sensors are necessary and this increases the cost of materials and assembly effort for the kind of arrangement being described here, thus impacting manufacturing costs. Another method measures the excess pressure prevailing in an air cushion directly with the help of a relative pressure sensor. Such a sensor must have a separate air channel connected to the surroundings, but owing to this constructive peculiarity, it is relatively expensive. Therefore, the manufacturing costs of the second method are virtually no different from those of the first.

In vehicle seats that have merely two air cushions and no pressure sensor, the form increase usually takes place by filing both air cushions simultaneously without taking the position adjusted so far into account. Even an adjustment in vertical direction takes place irrespective of the adjusted position by filling the air cushion lying in adjustment direction and emptying the air cushion facing away from the adjustment direction.

The disadvantage of the known state-of-the-art devices and methods for adjusting a vehicle seat contour is that measuring the pressures merely allows one to evaluate the force exerted. The actual adjustment position is assumed here to be given as direct correlation. Moreover, the utilization of pressure sensors entails significant additional manufacturing costs and more assembly effort. However, if pressure sensors are dispensed with, then the contour of the vehicle seat can no longer be selectively adjusted.

SUMMARY

Considering the above, it is the task of the invention to suggest an economical device of the type mentioned above and a method that allows the selective adjustment of the contour of a vehicle seat.

The task mentioned first is solved by a device according to the present disclosure. The device for adjusting a contour of a vehicle seat with a contour adjustment comprises at least one air cushion connected to a pump via a supply line, a first valve that opens and closes the supply line, and a control and evaluation unit to determine the air quantity being supplied to the at least one air cushion by means of a pump's operating time and to correlate the air quantity being supplied to the air cushion or the pump's operating time with a contour of the vehicle seat.

Starting with a known air cushion volume and a known handling capacity of the pump per unit of time, a fixed filling time or operating time of the pump is expected in order to fill the air cushion fully. Intermediate positions, in which the air cushion is partially filled, are achieved by the corresponding shorter operating times. Thus, with the help of the control and evaluation unit, an operating time of the pump is recorded and the air quantity or air volume supplied to the at least one air cushion is determined, taking the conveying quantity of the pump into account. Therefore, depending on the pump's operating time and the quantity of air supplied, a certain contour or form of the vehicle seat can be adjusted. The air quantity necessary for adjusting a desired contour of the vehicle seat is determined by the control and evaluation unit and supplied accordingly by controlling the pump.

Thus, the pump's operating time or air volume supplied to the air cushion (i.e. the volume conveyed by the pump within this time period) serves as first indicator for the manifestation of lordosis. The lordosis adjustment (i.e. of the curvature of the air cushion) can thus be evaluated over the pump's operating time without needing to measure the pressure inside the air cushion. The filling extent of the air cushion or of the excess pressure in it is primarily determined by means of the air quantity being supplied to the air cushion during the pump's operating time.

Therefore, the idea of the invention consists of providing a device that allows one to determine the form of the air cushion or of the excess pressure inside the air cushion and with it the adjustment of the vehicle seat contour without pressure sensors, which represents a considerable simplification in the manufacturing and assembly of the vehicle seat system.

In an advantageous embodiment of the invention, the control and evaluation unit comprises a measuring device to record a measured value of a power consumption and/or rotational speed of the pump. If, for example, a passenger exerts more pressure on the air cushion, then the measured value of the pump's power consumption changes because the pump's increasing conveying pressure requires a higher torque which, in turn, has a direct effect on the power consumption of the driving motor. The pressure depends on the pump's torque which, in turn, depends on the power. In this way, conclusions about the pressure inside the bladder can be drawn from a power measurement.

The pump's rotational speed is proportional to the voltage of the voltage source, which is the vehicle battery here. Thus, a reduction of the voltage leads to a reduction of the pump's rotational speed, which can be recorded by means of the measuring device. The final pressure is also reached with reduced voltage and thus the pump's slower rotational speed is attained, but the operating time of the pump necessary to achieve this is extended and thus the filling of the air cushion as well. Thus, depending on the measured value recorded for the rotational speed of the pump, the pump's operating time can be adjusted to supply the air quantity to the air cushion necessary for adjusting the contour. Alternatively, the pump's rotational speed could also be adjusted to achieve the same pump performance as with the previous higher voltage of the voltage source, for example.

If the measured value for the power consumption or the pump's rotational speed changes, this can therefore be used as one more indicator of how much the air cushion has already filled and what operating time of the pump is needed. As a result of this, when the contour of the vehicle seat is adjusted, for example, the force of the weight of a vehicle passenger acting on the air cushion is taken into account.

Furthermore, the measured value of the power consumption can also be used to regulate the pump's rotational speed. In an almost fully filled air cushion, reflected by the increasing pressure in an increase of the measured value for the power consumption, the rotational speed—and with it, the conveying volume—can also be reduced. Especially with high rotational speeds, the pump pressure does not equal the pressure in the air cushion, as the supply lines represent resistance, for example. Thus, with a reduced rotational speed, the power measured is lower than with full rotational speed. By reducing the rotational speed shortly before the filling process, measuring errors caused by resistances in the supply lines can be reduced, so that the pressure in the air cushion can be adjusted more precisely without needing too much extra time for this.

In addition, the device comprises especially a venting line with a second valve arranged inside it, specifically a venting valve that can be used to close and reopen the venting line.

It is furthermore advantageous if the control and evaluation unit comprises a storage element to store the measured values recorded and those measured values determined through correlation and/or to save a curve characterizing the pump and/or a valve. As a result of that, the pump's operating times or the air quantity supplied to the air cushion (which corresponds to a certain form or contour of the vehicle seat) can be used for subsequent filling processes while the form is vertical adjusted, for example. An adjustment of the respective seating position can therefore be saved for various persons and retrieved once again after adjusting the contour of the vehicle seat. Likewise, the operating time expected for a complete filling and the operating times determined for intermediate positions can also be stored.

If there are several air cushions, the form is vertically adjusted with an additional air cushion filled subsequently with a comparable air volume or a comparable operating time of the pump to achieve the desired form. When reducing the form, the air cushion is at least partially emptied and the air leaves through the venting valves. Depending on the form stored previously and the venting time necessary for emptying, a new form or contour of the air cushion is adjusted and advantageously stored in the storage element. This value stored in connection with the venting time and other parameters can then serve as new starting position for a further adjustment. In other words: The fixed interrelationships between the pump's operating time, the air quantity conveyed by the pump, the power consumption and rotational speed of the pump, as well as the actual adjustment position or form of the air cushion are used as basis for subsequent adjustment processes. Thus, the operating time and air quantity values that correlate with the various vertical adjustment positions and forms are stored in the control and evaluation unit. If the adjustment position or form should be changed, the control and evaluation unit determines the actions needed to reach the new position and controls the valves or pump accordingly, based on the actual position.

In conventional seat contour adjustment systems, the filling process ends in each case only after a maximally set operating time of the pump elapses, so that air is supplied to the air cushion even when it is completely filled and, at the same time, air is released through an excess pressure valve. Here, the control and evaluation unit has been designed in such a way that the achievement of a desired vehicle seat contour (i.e. a final position) is indicated to the user by turning off the pump, for example. This prevents the user from receiving a pump action signal that does not noticeably change the vehicle seat's contour but causes disturbing noises.

The conveying volume vs. the pressure (i.e. the conveying quantity per time compared to the pressure) is stored as a curve that characterizes the pump. This allows a more accurate evaluation of the air quantity needed for a desired form, as the operating time is determined in each case by the used pump. By including the characteristic pump curve in the evaluation of the air quantity, the design of the respectively used pump is taken into account. As an additional characteristic curve of the pump, the conveying pressure and the pump current necessary for this are put in proportion.

The control and evaluation unit comprises especially a control unit to record and evaluate the measured value for the power consumption or pump current, which represents an additional control option for the adjustment position. The pump current achievable with an empty and completely filled air cushion serves here as limit for a plausibility test.

For safeguarding and further referencing, the device advantageously comprises a pressure relief device, e.g. a pressure relief valve, to prevent a limit stored in the control and evaluation unit to be exceeded. The limit is fixed, for example, with an operating time expected for filling the air cushion completely. Such a pressure relief device serves as additional corrective factor while the air cushion is being filled. When the pressure relief device responds, the pressure in the air cushion does not keep increasing—and therefore not the form either—even when the pump's stored or saved operating time for creating a desired form has not elapsed yet. This ensures that it will be possible to operate the device only within fixed limits to prevent an excessive pressure in the air cushion, for example. If the system exceeds the maximum permissible pressure, this becomes evident in the no longer changeable power consumption of the pump. This inflexion point in the curve is used as correction factor for the pump's operating time adjustment and thereby the system is optimized and matches the air supply properties, especially the deviations of the above-mentioned characteristic curves of the pump.

The task mentioned in second place is solved with a method for adjusting a contour of a vehicle seat with contour adjustment using such a device, whereby an air quantity supplied to at least one air cushion is determined by means of a pump's operating time and the air quantity supplied to at least one air cushion or the pump's operating time is correlated with a vehicle seat contour.

Thus, the air quantity supplied to at least one air cushion or an air volume is determined from the pump's operating time by means of the volume conveyed by the pump and correlated with the vehicle seat contour. In other words: A certain form or contour of a vehicle seat is determined depending on the pump's operating time (i.e. the time it takes to fill the air cushion) and thus on the air quantity introduced into the air cushion. Since the volume of the supplied air quantity is known, conclusions can be drawn about the pressure inside the air cushion from the air quantity supplied.

In particular, the value of the vehicle seat contour correlated with the pump's operating time and/or the air quantity supplied to the air cushion is stored in the control and evaluation unit so that, ideally, a correlation with the pump's operating time is saved for each vertical adjustment position or form in the control and evaluation unit. Ideally, several adjustment positions and forms are stored depending on the pump's operating time and/or the air quantity supplied. If the adjustment position or form needs to be adjusted, the control and evaluation unit determines the difference values or actions necessary for achieving the new position from the current position and controls the valves or the pump accordingly. The correlating value determined can thus be used in each case as starting position for a subsequent adjustment of the vehicle seat contour. In a vertical adjustment, for example, a second air cushion lying above or below the first air cushion is filled in a comparable filling time and thus with a comparable air volume. To attain a form reduction, the air quantity inside the air cushion can be let out via a venting valve. The attainment of the desired contour of the vehicle seat or of a desired adjustment position and a final pressure inside the air cushion are indicated to the user by a turning off of the pump, for example.

Furthermore, in an advantageous embodiment, a measured value for the pump's power consumption is determined and from it, a value for the excess pressure inside the at least one air cushion is determined and correlated with a vehicle seat contour. The pump pressure depends on the torque of the pump motor. The torque, in turn, depends on the power consumption or pump current, so that, overall, the pressure depends on the current. This allows one to dispense with pressure measurement and to determine the pump's pressure and the excess pressure inside the air cushion by means of the pump's power consumption.

Preferably, the measured value for the pump's power consumption, the value determined from it for the pressure inside at least one air cushion, and the values correlated with the contour of the vehicle seat are stored in the control and evaluation unit for use in subsequent adjustment processes.

A measured value for a pump's rotational speed can also be determined, and the operating time of the pump that is necessary to adjust a vehicle seat contour depending on the measured value recorded for the pump's rotational speed can be varied.

In a preferred variant of the method, the measured value of the power consumption is used for regulating the pump's rotational speed, which is varied depending on the pressure inside the at least one air cushion (i.e. the degree of filling of the air cushion). In an almost completely filled air cushion, reflected by the increasing pressure in an increase of the measured value of the power consumption, the rotational speed can be lowered—and with it, the conveying volume as well—to reduce the measuring errors caused by the supply lines and increase the accuracy of the determined air volume supplied to the air cushion, and consequently to increase the pressure by means of the measured value of the power consumption. This is done, for example, by reducing the pulse-width modulation towards the end of the filling process. Thus, the control and evaluation unit takes over the regulation of the rotational speed while measuring the power.

BRIEF DESCRIPTION OF THE DRAWING

The invention is now explained in more detail in FIG. 1, showing a schematic view of an embodiment of the invention.

DETAILED DESCRIPTION

The device 1 shown in FIG. 1 is built into a vehicle seat (not shown) that comprises a contour adjustment and has one or several air cushions 2, although only one air cushion 2 is shown for reasons of simplification. The air cushion 2 is connected to a pump 4 (specifically, a pneumatic pump) through a supply line 3. In the supply line 3, between the pump 4 and the air cushion 2, a first valve 5 has been arranged, preferably designed as 2/2-way directional valve. In the resting position of the valve 5 shown in the drawing, in which it is held with the help of a spring 6, the supply line is closed 3, so that the air volume inside the air cushion 2 is trapped in a gas-tight way. To ventilate the air cushion 2, the first valve 5 can be adjusted, for example, with the help of an electromagnetic drive 7 in the working position, in which the supply line 3 or its connections are connected to the first valve 5 together. The air cushion 2 can be filled in the working position of the first valve.

A control and evaluation unit 9 is connected to the pump 4 or the motor through a control and measuring line 8. In addition, the valve 5 is controlled via the control and measuring line 8. Furthermore, a venting line 10 is provided, in which a second valve 11, a venting valve, is arranged and used to close and open the venting line 10. Likewise, the second valve 11 is preferably designed as a 2/2-way directional valve. In its resting position, which it takes owing to an impingement by a spring 6, it is in a closed position. Even the second valve 11 is controlled via the control and measuring line 8.

The control and evaluation unit 9 serves to determine the air volume V being supplied to the air cushion 2 and to record a measured value of the operating time t of the pump 4, whereby the air volume V supplied to the air cushion 2 or operating time t of the pump 4 is brought in with a contour K of the vehicle seat. Thus, for adjusting a contour K of a vehicle seat, a measured value t is determined for an operating time of the pump 4 and from it an air quantity V supplied to the at least one air cushion, and the operating time t of the pump 4 or the air volume V supplied to the at least one air cushion 2 is correlated with a contour K of the vehicle seat. Employing known physical relationships, the excess pressure p prevailing in the air cushion 2 can be determined from the volume of the air cushion 2 and the supplied air quantity V.

The value of the contour K of the vehicle seat correlated with the operating time of the pump 4 and the air quantity V is stored, just like the values determined for the operating time t and air quantity V, in a storage element 14 of the control and evaluation unit 9, so that it can serve as starting point for subsequent adjustment processes. In addition, the curves that characterize the pump 4, for example the dependence of the current on the pump's pressure, are saved in the storage element 14. This storage element 14 also contains the characterizing curves of the venting valve 11 that are relevant to the ventilation.

Furthermore, the control and evaluation unit 9 comprises a measuring device 13 to record a measured value of the power consumption I and the rotational speed n of the pump 4, which serve as additional indicators for the degree of filling of the air cushion 2. In addition, a control unit 15 is provided for the control and evaluation unit 9 to record or evaluate the measured value of the power consumption or pump current so that a plausibility test dealing with the adjustment position or form can be carried out.

Additionally, a pressure relief device 12, namely a pressure relief valve, has been arranged in the supply line 3 between the pump 4 and the first valve 5. The pressure relief device 12 prevents a previously set limit for the pressure p or the form K to be exceeded and thus serves as additional safeguard so the device 1 can be operated only within fixed limits. Thus, the pressure relief device 12 represents an additional correction factor for operating the device 1. Even with a longer operating time t of the pump 4 stored in the control and evaluation unit 9, an "overfilling" of the air cushion 2 can be prevented in this way.

To adjust the contour K of the vehicle seat, an operating time t of the pump 4 necessary for the desired form, and from it the air quantity V supplied to the at least one air cushion 2, is determined. The air quantity V is thereupon correlated with the contour K of the vehicle seat adjusted in this case and stored in the control and evaluation unit 9, together with the values determined for the operating time t of the pump 4 and the air quantity V, so they can be used for subsequent adjustment processes.

Furthermore, a measured value for the power consumption I of the pump 4 is recorded and used for determining the pressure p in the air cushion 2. The measured value for the power consumption I of the pump 4 and the value for the pressure p are, in turn, stored with the contour K of the vehicle seat and, together with the measured values for the power consumption I and the pressure p, in the control and evaluation unit 9.

Moreover, the control and evaluation unit can determine the rotational speed n of the pump 4. It is advantageous if the measured value of the power consumption I is used to regulate the rotational speed n of the pump 4 and the rotational speed n of the pump 4 is varied depending on the pressure p inside the air cushion 2 or the air volume V supplied to the at least one air cushion 2. An increasing pressure p leads to an increase of the measured value of the power consumption I. Thus, it is especially possible to store in the control and evaluation unit 9, for example, a limit for the measured value of the power consumption I, with which a reduction of the rotational speed n should take place, to reduce pressure measurement errors.

The invention claimed is:

1. A device to adjust a contour of a vehicle seat with contour adjustment, the device comprising:
   at least one air cushion connected to a pump through a supply line;
   a first valve for opening and closing the supply line; and
   a control and evaluation unit to determine without using a pressure sensor whether an overpressure is present in the at least one air cushion based on an air quantity supplied to the at least one air cushion determined via an operating time of the pump and via an amount of power consumption of the pump during the operating time, and to correlate the air quantity supplied to the at least one air cushion with a contour of the vehicle seat.

2. A device according to claim 1, wherein the control and evaluation unit includes a measuring device to record a measured value of the power consumption and the rotational speed of the pump.

3. A device according to claim 1, further including a venting line with a second valve arranged therein.

4. A device according to claim 2, wherein the control and evaluation unit includes one storage element to perform at least one of:
   storing the recorded measured values and a calculated measured value determined through correlation of the recorded measured value; and
   saving a curve that characterizes the pump and the first valve.

5. A device according to claim 2, wherein the control and evaluation unit includes a control unit for recording and evaluating the measured power consumption values.

6. A device according to claim 1, further comprising a pressure relief device to prevent a limit saved in the control and evaluation unit from being exceeded.

7. A method to adjust a contour of a vehicle seat with contour adjustment, the vehicle seat having at least one air cushion connected to a pump through a supply line, a first valve for opening and closing the supply line, and a control and evaluation unit to determine an air quantity supplied to the at least one air cushion via an operating time of the pump and via an amount of power consumption of the pump during the operating time and to correlate the air quantity supplied to the at least one air cushion with a contour of the vehicle seat, the method including the steps of:
   determining without using a pressure sensor whether an overpressure is present in the at least one air cushion based on the air quantity supplied to the at least one air cushion determined via the operating time of the pump and via the amount of power consumption of the pump during the operating time; and
   correlating the air quantity supplied to the at least one air cushion according to the contour of the vehicle seat.

8. A method according to claim 7, wherein, after a value of the contour of the vehicle seat correlated with at least one of the operating time of the pump, the air quantity supplied to the at least one air cushion is stored in the control and evaluation unit.

9. A method according to claim 7, wherein, after a measured value for the power consumption of the pump and a value for the pressure inside the at least one air cushion are determined, the measured value for at least one of the power consumption of the pump and the value for the pressure is correlated with a contour of the vehicle seat.

10. A method according to claim 9, wherein the measured value for the power consumption of the pump, the value determined for the pressure inside the at least one air cushion, and the value correlated with the contour of the vehicle seat are stored in the control and evaluation unit.

11. A method according to claim 9, wherein the measured value of the power consumption is used to regulate the rotational speed of the pump and the rotational speed of the pump is varied depending on the pressure inside the at least one air cushion during the operating time of the pump.

* * * * *